Patented Feb. 3, 1931

1,791,476

UNITED STATES PATENT OFFICE

GUSTAF HAGLUND, OF STOCKHOLM, SWEDEN, ASSIGNOR TO PATENTAKTIEBOLAGET GRÖNDAL-RAMEN, OF STOCKHOLM, SWEDEN, A LIMITED COMPANY

PROCESS OF PRODUCING AT THE COOKING OF CELLULOSE AND ESPECIALLY OF SULPHITE CELLULOSE A WASTE LIQUOR CONTAINING A HIGH PERCENTAGE OF ORGANIC MATTERS

REISSUED

No Drawing. Application filed March 1, 1930, Serial No. 432,564, and in Sweden April 10, 1929.

At the cooking of cellulose it has been suggested to add to the cooking liquor part of the waste liquor from a previous cooking operation for obtaining in that way a waste liquor containing a large percentage of organic matters; by that treatment the materials dissolved in the liquors will be essentially more concentrated than liquors, consisting only of raw material dissolved in a watery solution. In the same manner such a concentration of organic matters in the waste liquor from a cooking operation can be obtained by transferring to the fresh cooking liquor, destined for a new cooking operation, part of the liquor contained in a cooking apparatus already in operation.

In these two cases the cooking, however, does not take place in completely the same manner as when a watery solution of the cooking means is used without any addition of liquor from a previous cooking operation or operations. In the case last mentioned the cooking process takes place more slowly and the product may easily obtain a dark colour and also will become weakened on account of the extension of the cooking period.

The present invention has for its object to prevent these inconveniences whether the cooking liquor has been mixed with cooking liquor from previous cookings or with liquor from such one still under action. According to my invention the wooden chip before the cooking operation is brought to absorb the cooking liquor, prepared in the usual manner with water and that thereupon waste liquor from a previous cooking operation or from a cooking apparatus, the contents of which is still under cooking, is added.

The process is carried out in such a manner, that a cooking liquor, containing gases or not, which has not before been used for cooking, is fed into a cooking apparatus, containing wooden chips, which will then absorb part of the liquor, the rest of which is thereupon drawn from the apparatus. That apparatus is thereafter filled with a cooking liquor consisting of a mixture of the same liquor as that above stated and a waste liquor from a previous pulp cooking process or a liquor from such process, still not finished.

The cooking operation in the apparatus thus charged is thereupon begun. This treatment will not cause any loss of time, because the chips in all circumstances want some time for the absorbation of the cooking liquor. The process requires, however, an increased pumping action. For effecting a rapid sucking in of the unmixed cooking liquor in the chips, the cooking apparatus, as stated, is completely filled with that liquor.

The pumping means are arranged in such a manner that the liquor is introduced in the cooking apparatus under pressure, because it will hereby become possible to facilitate the saturation of the chips and thereby to shorten the time for the sucking operation. This saturation of the chips with cooking liquor before the cooking operation of course may take place outside the cooking vessel or apparatus itself and the cooking thereupon may be carried out in the latter one after its filling with fresh cooking liquor mixed with waste liquor from a previous cooking or with liquor from a cooking apparatus in operation as mentioned at the end of the first paragraph.

The impregnation of the chips with cooking liquor before the cooking process proper, as stated above, is of importance for the said process at every cooking of cellulose and must take place so substantially and rapidly as possible, for which reason the use of pressure at the soaking is of great importance also for the cooking operations used at present. Such a soaking of the chips with un-mixed cooking liquors before the cooking operation but with that operation executed by mixed cooking liquor of the composition, above stated, is of the same importance for other processes of cellulose cooking, for instance by alkaline cooking operations, even although the inconveniences thereby are not so evident as in the production of sulphite cellulose.

Having now particularly described the nature of my invention and the manner of its operation, what I claim is:

1. An improved process of producing at the cooking of cellulose, for instance of sulphite cellulose waste liquors, containing a high percentage of organic matters, characterized thereby, that the chips, before the cooking are soaked with a cooking liquor, produced in the usual manner without any addition of waste liquors from previous cooking operations, and that after an eventual removal of part of the cooking liquor, the cooking is executed with a cooking liquor, mixed with waste liquor from a previous cooking or with such liquor from a cooking apparatus, still in action.

2. The process stated in the claim 1, characterized thereby, that the soaking of the chips with cooking liquor before the cooking operation is carried out under pressure, for the purpose of facilitating the soaking.

GUSTAF HAGLUND.